Nov. 1, 1966
H. C. CAIN
3,282,250
MILKING SYSTEM
Filed March 27, 1961
7 Sheets-Sheet 1
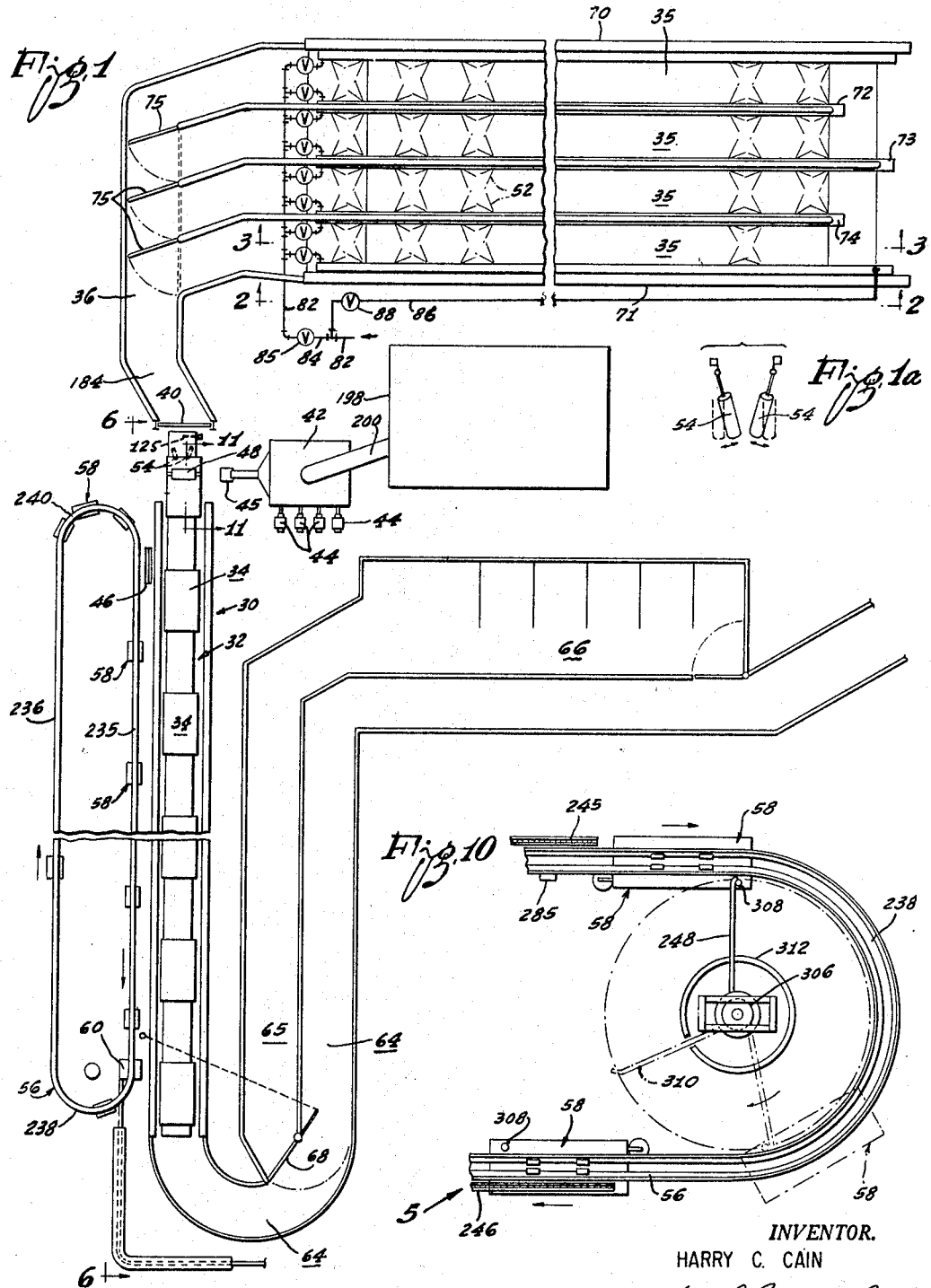
INVENTOR.
HARRY C. CAIN
ATTORNEYS

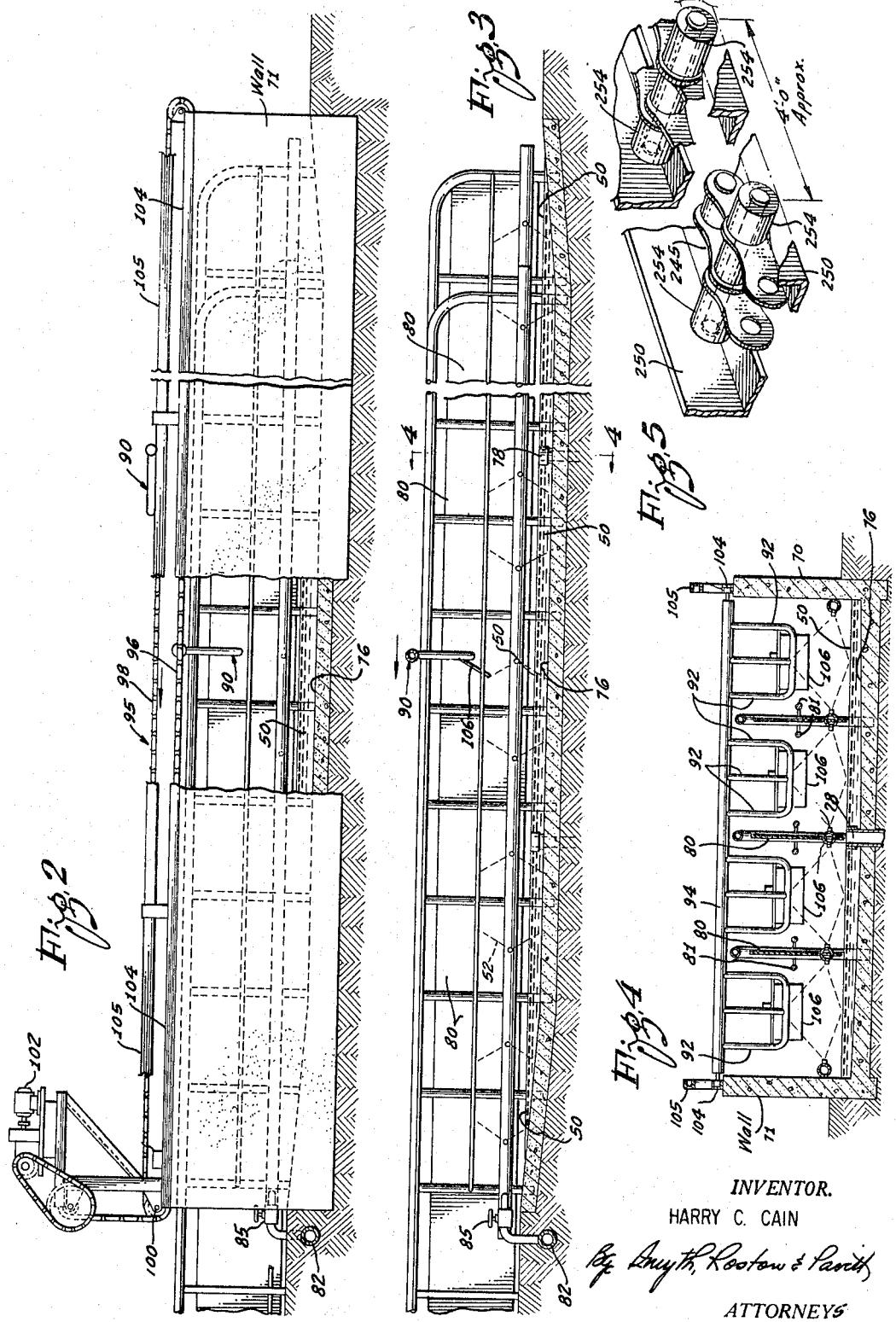

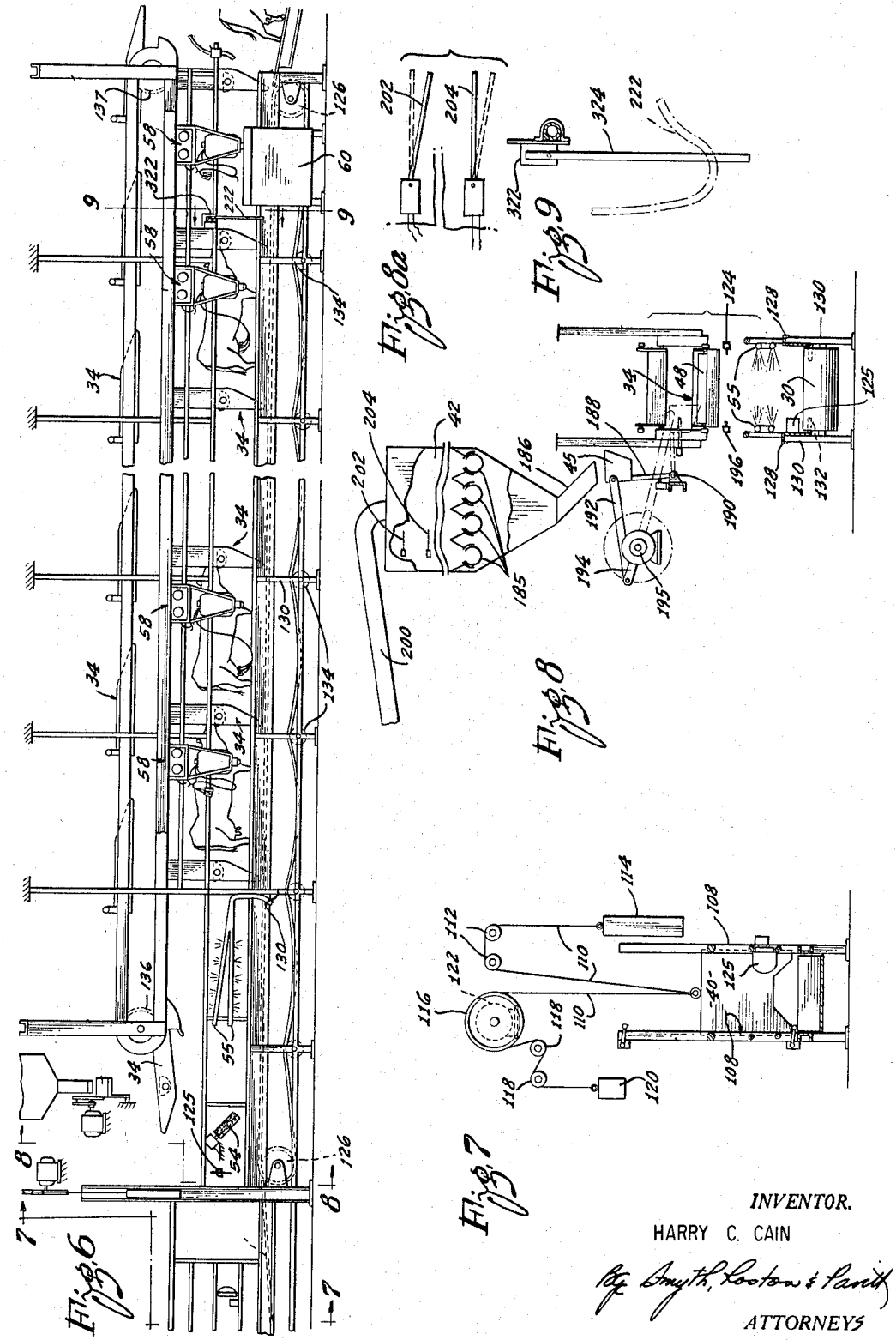

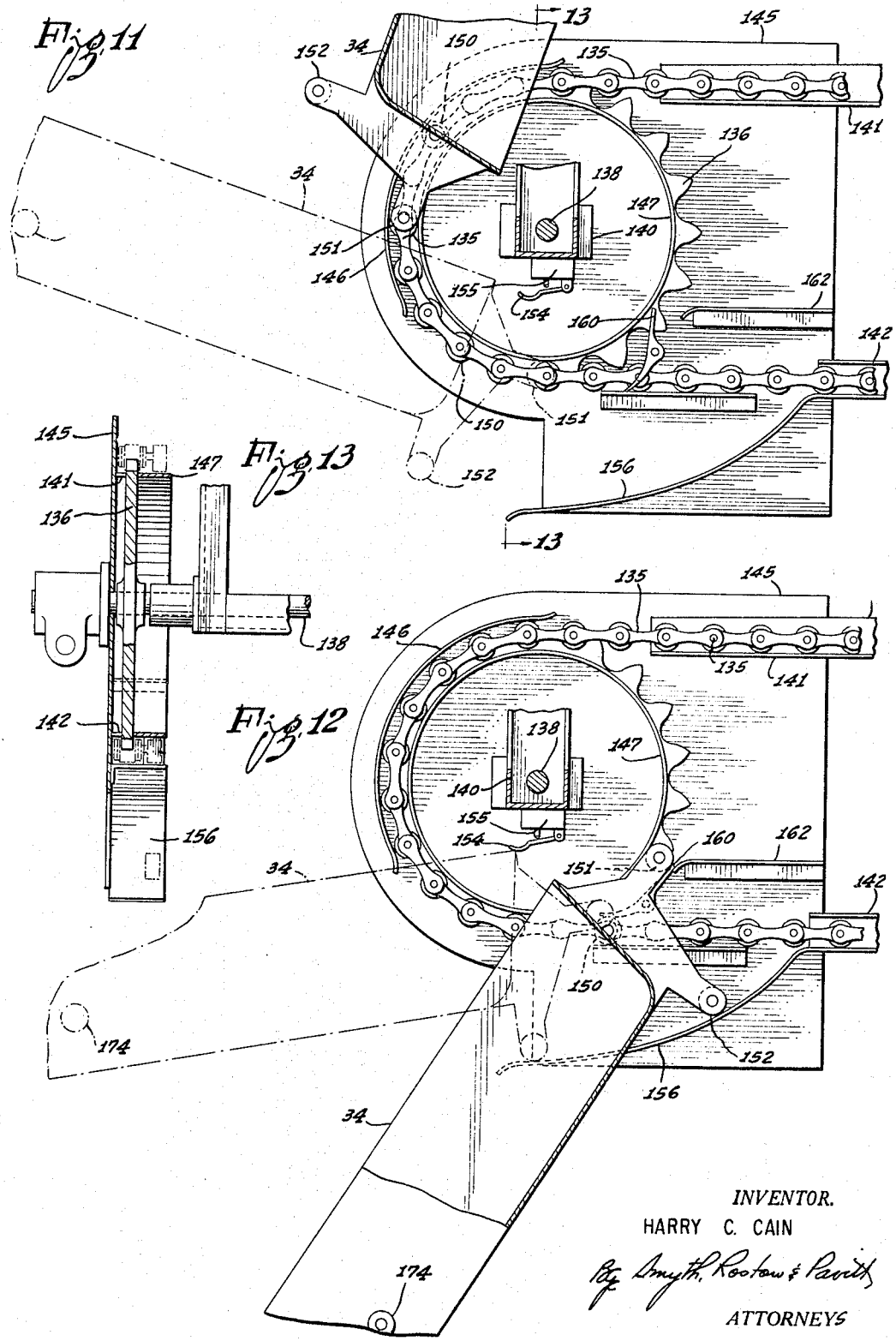

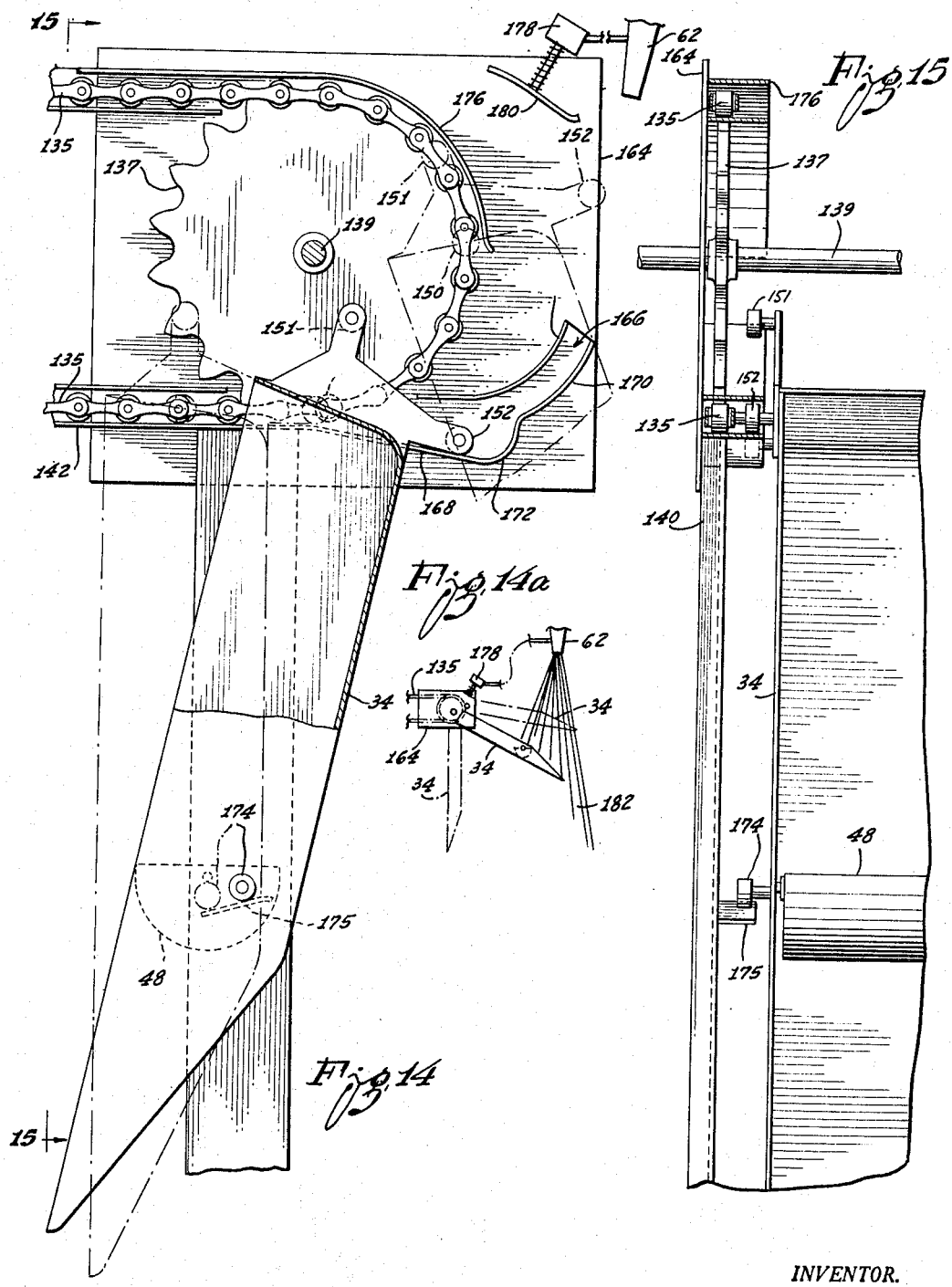

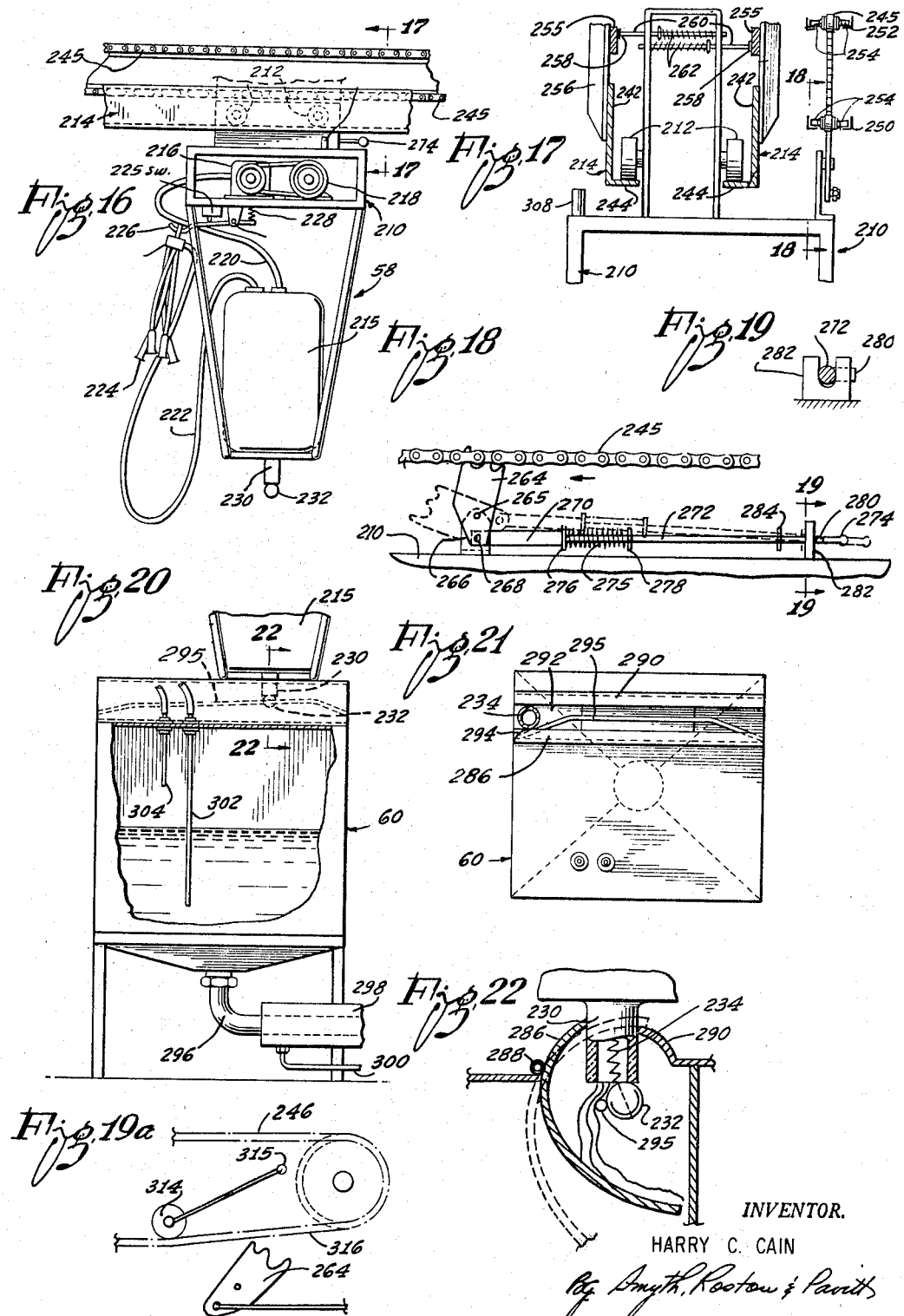

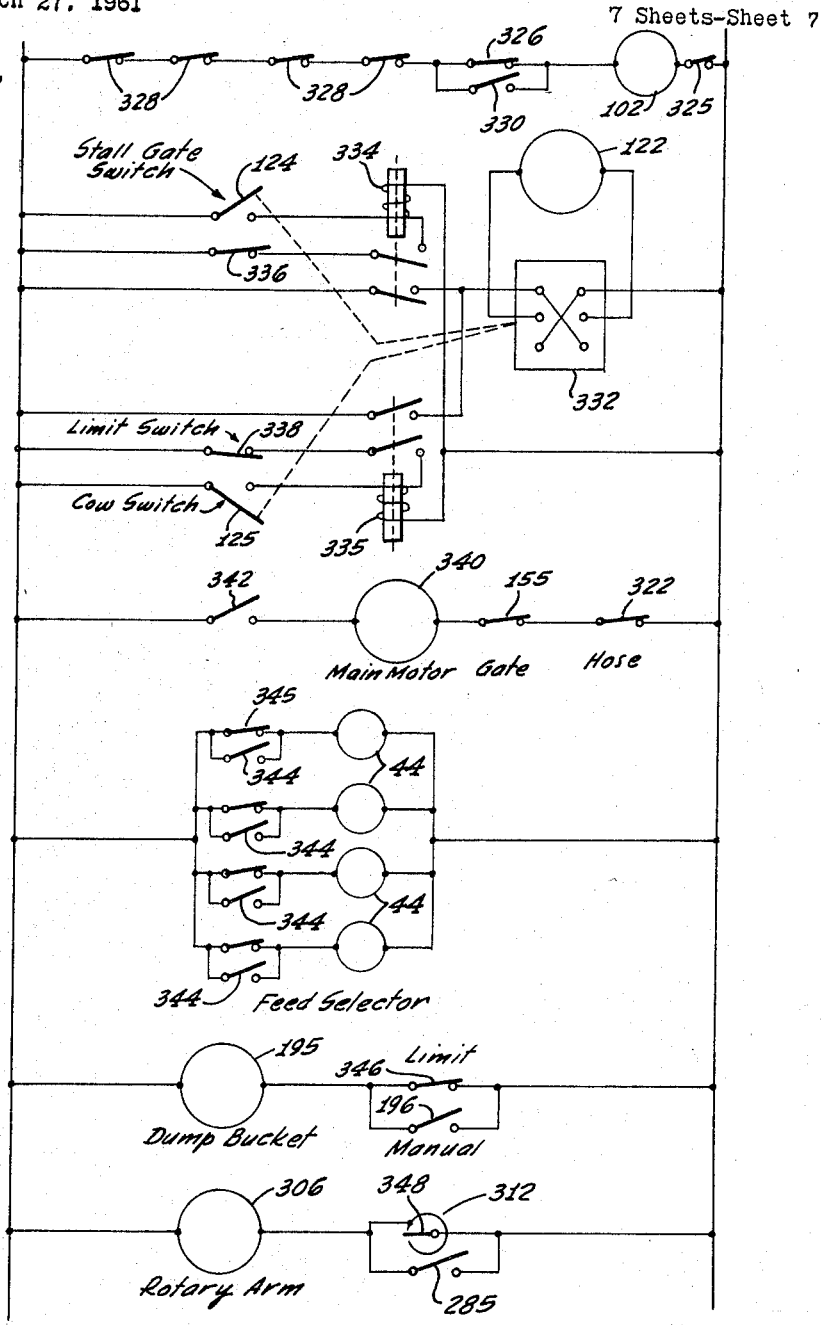

United States Patent Office 3,282,250
Patented Nov. 1, 1966

3,282,250
MILKING SYSTEM
Harry C. Cain, 1836 Rosecrans Ave.,
Manhattan Beach, Calif.
Filed Mar. 27, 1961, Ser. No. 98,366
6 Claims. (Cl. 119—14.04)

This invention relates to a system for milking cows and is directed both to reduction of the cost of milking a herd of cows and to increase in the quantity of the milk produced. In addition, the invention may be used advantageously for public demonstration during each milking operation to attract customers as well as to educate the public.

The desired reduction in cost of milking cows is achieved by substantially complete automation starting with a herd of cows from a home corral. The cows are automatically urged and directed to a conveyor in the form of a moving platform. First, the cows are directed through a plurality of approach lanes and then proceed in single file to the platform conveyor. While passing through the system of approach lanes, the cows walk through shallow water to clean their hoofs and then the cows are sprayed with water on their undersides. Further provision is made for automatic brushing of the cows' bodies.

The cows are automatically admitted in correct timing to stalls on the moving platform, the stall being formed successively by overhead stall gates. Feed is delivered automatically to the traveling stalls but with the quantity of feed varied to suit the needs of individual cows. Self-contained powered milking units travel on an adjacent overhead track at the same rate as the cow conveyor and are connected to the teats of the traveling cows. The milking units are emptied automatically with provisions to prevent contamination of the milk. The milking units are then returned automatically for reuse.

On leaving the platform conveyor at the end of the milking operation the cows are directed by a return lane to their home corral. If any animal needs medical attenion, however, the operator opens a gate by remote control to divert the cow into a hospital pen.

The features and advantages of the invention may be understood from the following detailed description and the accompanying drawings.

In the drawings, which are to be regarded as merely illustrative:

FIG. 1 is a diagrammatic plan view of the entire system;

FIG. 1a is a fragmentary plan view of a pair of rotary brushes for cleaning the successive cows;

FIG. 2 is a side elevation of the system of approach lanes, as viewed along the line 2—2 of FIG. 1;

FIG. 3 is a longitudinal section of the system of approach lanes taken along the line 3—3 of FIG. 1;

FIG. 4 is a transverse section of the set of parallel approach lanes taken as indicated by the line 4—4 of FIG. 3;

FIG. 5 is a fragmentary perspective view of a portion of a conveyor chain for the milking units;

FIG. 6 is a side elevation of the platform conveyor that carries the cows through the milking operation;

FIG. 7 is a front elevation as viewed along the line 7—7 of FIG. 6 showing a stop gate that admits the cows in sequence to the sequentially formed stalls on the platform conveyor;

FIG. 8 is an elevational view as seen along the line 8—8 of FIG. 6 showing the arrangement for supplying feed to the successively formed stalls on the platform conveyor;

FIG. 8a is a diagrammatic view showing controls inside the hopper of FIG. 8;

FIG. 9 is an elevational view of a safety device for stopping the platform conveyor in the event that a milking unit is still attached to the cow when the cow reaches the end of the conveyor;

FIG. 10 is a fragmentary plan view of one end of the overhead conveyor for the milking units;

FIG. 11 is an enlarged fragmentary sectional view of the stall gate conveyor at the entrance end of the platform conveyor;

FIG. 12 is a similar view showing the parts in different positions;

FIG. 13 is a transverse section taken as indicated by the line 13—13 of FIG. 11;

FIG. 14 is a view similar to FIGS. 11 and 12 showing a stall gate at the exit end of the cow conveyor;

FIG. 14a is a diagrammatic view showing a sprayer for cleaning each stall gate at the end of the cow conveyor;

FIG. 15 is a section along the line 15—15 of FIG. 14;

FIG. 16 is a side elevation of a milking unit suspended from the milking unit conveyor;

FIG. 17 is a fragmentary section on the line 17—17 of FIG. 16;

FIG. 18 is a side elevation viewed along the line 18—18 of FIG. 17 showing the means on a milking unit for releasable engagement with the milking unit conveyor;

FIG. 19 is a fragmentary section taken along the line 19—19 of FIG. 18;

FIG. 19a is a fragmentary diagrammatic view of one end of the return conveyor for the milking units;

FIG. 20 is an elevation of the receiver tank into which the milking units are emptied, parts being broken away to show concealed structure;

FIG. 21 is a plan view of the receiver tank;

FIG. 22 is a fragmentary section taken along the line 22—22 of FIG. 20 to show how the structure of the receiver tank cooperates with a milking unit; and FIG. 23 is a wiring diagram of a control system that may be used.

General arrangement

The principle parts of the system include: a cow conveyor 30 in the form of a moving platform to carry the cows through a milking zone; a stall-gate conveyor 32 which may be considered a part of the platform conveyor since it carries a succession of stall gates 34 to form successive stalls on the platform conveyor; a plurality of approach lanes including a set of parallel lanes 35 and a leading lane 36 which leading lane terminates at the entrance to the platform conveyor; a stop gate 40 at the end of the leading lane which opens to admit a cow to the platform conveyor in response to the formation of the successive stalls and which closes in response to the movement of a cow onto the platform conveyor; an overhead feed hopper 42 having four feeder units to be operated selectively by four corresponding motors 44 to deliver selected quantities of feed to a feed bucket 45 (FIGS. 1 and 8) the four motors being remotely controlled from a control panel 46 (FIG. 1) at the entrance end of the milking zone, the feed bucket being automatically emptied into feed troughs 48 carried by the successive stall gates 34; a shallow pool of water at the set of parallel approach lanes 35 through which the cows walk for the purpose of cleaning the cows' hoofs; a plurality of sprays 52 in the set of parallel approach lanes 35 to spray the udders and undersides of the approaching cows; a pair of rotary brushes 54 (FIGS. 1a and 6) for further cleaning of the cows as they leave the stop gate 40; a plurality of sprays 55 for applying warm water to the udders of the cows to relax the cows and stimulate the milk hormones at the entrance end of the platform conveyor; an overhead conveyor 56 synchronized with the cow conveyor 30 to carry successive self-contained powered milking units 58 for milking the cows as the cows are carried through the milking zone; a receiver tank 60 into which the successive milking units empty automatically; a sprayer 62 (FIGS. 14 and 14a) for cleaning the backs of the stall gates 34 at the exit end of the platform conveyor; a return lane 64 for returning the milked cows to their home corral; a hospital lane 65 leading to a hospital pen 66; and a diverting gate 68 operable by remote control from the end of the milking zone to divert cows into the hospital lane.

*The approach lanes*

In the particular arrangement shown in FIG. 1 there are four parallel approach lanes 35 formed by two outside concrete walls 70 and 71 and three intermediate walls 72, 73 and 74 which intermediate walls are of open construction and may be made of pipe. It may be noted in FIG. 1 that the intermediate wall 73 divides the entrance into two halves for dividing the herd of cows. After the cows are divided into two streams, the intermediate walls 72 and 73 subdivide each of the two streams. This arrangement tends to distribute the cows uniformly among the four parallel lanes 35.

The four parallel lanes 35 exit into the leading lane 36 laterally thereof. The exit ends of the three intermediate wall structures 72, 73 and 74 are provided with corresponding swinging gates 75 which are movable between the dotted positions in FIG. 1 to close off the three corresponding parallel lanes 35 and the solid line positions at which they extend across the leading lane 36. It will be noted in FIG. 1 that each of the four lanes 35 changes direction slightly to approach the leading lane 36 at an acute angle.

A herd of cows becomes quickly accustomed to the milking system so that all of the cows strive to reach the milking zone. The arrangement of approach gates enables the cows to determine their own sequence. In general, the arrangement of swinging gates favors the cows that are in the leading lane 36. In other words if the leading lane 36 is fully occupied by cows with the gates 75 at their dotted positions, the cows in the leading lane have something of an advantage over the cows who are attempting to enter the leading lane from the parallel lanes 35. The more aggressive cows in the parallel lanes, however, overcome the disadvantage.

The concrete structure of the approach lanes including the two concrete side walls 70 and 71 forms a shallow sump 76 with the bottom inclined at the opposite ends of the sump to retain the previously mentioned shallow pool of water 50 through which the cows walk in the four parallel lanes 35. The depth of the pool of water is determined by an overflow pipe 78.

The previously mentioned sprays 52 are located at spaced points along each of the four parallel lanes 35 and are at low elevations to direct the sprays upward towards the cows' udders without spraying the heads of the cows. The longitudinal walls 72, 73 and 74 that separate the four lanes 35, being of open construction, would permit the spray from one lane to strike the head of a cow in an adjacent lane. To prevent this possibility each of the dividing walls 72, 73 and 74 is provided with a sheet metal panel 80 to serve as a guard or baffle. The cows are kept centered on the lanes 35 by pairs of centering rails 81 (FIG. 4).

Water to supply the sprays 52 is delivered through a supply pipe 82. One branch 84 of the supply pipe that is equipped with a remotely controlled valve 85 supplies the sprayers in the left half of the set of parallel lanes 35, as viewed in FIG. 1 and a second branch pipe 86 equipped with a remotely controlled valve 88 delivers water to the right-hand group of sprays. This arrangement makes it possible to save water when only one-half of the lane arrangement is occupied by a herd.

An important feature of the invention is the provision of travelling barriers to urge the cows through the parallel lanes 35 and to separate one herd of cows from another. In the particular embodiment of the invention there are two barrier assemblies, each designated by numeral 90 in FIG. 2 for use alternately in the parallel lanes 35. As shown in FIG. 4 each of the barrier assemblies comprises a series of four indivdual barriers 92 to extend downward into the four parallel lanes 35 respectively. The four barriers 92 are fixedly carried by a transverse member 94 which may be a length of pipe.

The opposite ends of each of the two barrier assemblies 90 are carried by endless conveyor chains 95, each of which has a lower forward run 96 and an upper rearward run 98, the two chains being interconnected and synchronized by a driven shaft 100. The shaft 100 is actuated by a motor 102 by means of a suitable arrangement of sprocket chains and sprocket wheel as indicated in FIG. 2. The lower run 96 of each of the two conveyor chains 95 travels in a lower track 104 on the top of the corresponding concrete wall 70 or 71 and the upper rearward run 98 travels in a second upper track 105. The lower tracks 104 may be made of channel irons and the upper tracks 105 may be made of angle irons.

When a barrier assembly 90 is moving forward on the lower runs 96 of the two conveyor chains the barrier assembly hangs rigidly vertical as shown in FIGS. 2 and 3. When a barrier assembly 90 is carried by the upper runs 98 of the two chains, however, the barrier assembly lies horizontal as shown in FIG. 2. The construction of the barrier assemblies and the associated conveyor means need not be described in further detail because the same arrangement is used for conveying the stall gates 34 and will be described later.

In a preferred practice of the invention each of the four barriers 92 of a barrier assembly 90 is provided with an individual normally closed switch which opens in response to the contact of a yielding control member 106. Each of the yielding control members 106 on the individual barrier 92 may be in the form of a hinged paddle which is urged forward by a suitable spring (not shown) to a forward position for contact with the rear end of a cow. When the yielding control member 106 is pushed against a cow by the forward movement of the barrier 92, the consequent flexure of the yielding control member 106 opens the corresponding switch to stop the forward movement of the barrier assembly. By virtue of this arrangement, a barrier assembly that is operating in the four parallel lanes 35 will move forward until one of the yielding control members 106 contacts a cow in one of the lanes 35 and is depressed by contact with the cow. It is contemplated that a pressure on the order of five pounds will be required to operate one of the yielding control members.

When the barrier assembly 90 reaches the exit end of the set of parallel lanes 35, a suitable limit switch de-energizes the motor 102 to stop the barrier assembly automatically. At such time the second barrier assembly 90 is on the upper runs 98 of the two conveyor chains and is at the entrance end of the set of lanes 35 ready to swing downward into operative position. A new herd of cows is then directed into the set of lanes 35 and when the last cow enters a manual switch is operated to re-energize the motor 102. The starting of the motor 102 swings the forward barrier assembly upward out of the way and swings the rearward motor assembly downward behind the new herd of cows in the lane 35.

In the event that a cow intercepts the downward movement of the rearward barrier assembly, the corresponding yielding control member 106 of the barrier assembly is depressed by the cow to cause immediate de-energization of the motor 102. The four switches on a barrier assembly are controlled respectively by the four yielding control members 106 are de-energized when the barrier assembly is in horizontal position on the upper runs 98 of the two conveyor chains 95. For this purpose each of the barrier assemblies may be equipped with a mercury switch (not shown) which opens automatically whenever the barrier assembly turns to a horizontal position.

The stop gate 40 which is at the end of the leading lane 36 to time the entrance of the cows in sequence onto the platform conveyor may be of the construction shown in FIG. 7. The gate 40 is mounted for vertical movement in a pair of parallel guide members 108. A cable 110 which passes over a pair of guide rollers 112 connects the gate 40 to a counterweight 114 that is heavy enough to counterbalance all but a small fraction of the weight of the gate. For example, if the gate weighs 100 pounds, the weight 114 may weigh 90 pounds. A second cable 115 passes over a drive sheave 116 and around a pair of guide rollers 118 to a small counterweight 120 which may for example weigh approximately 10 pounds. The drive sheave 116 is actuated by a motor 122 which may be a relatively light motor because of the two counterweights.

The important advantage of this arrangement is that with the drive sheave 116 rotating to lower the stop gate 40, interruption in the downward movement of the stop gate by a cow under the gate results in imposing a downward force on the cow of no more than 10 pounds. In such an event, the drive sheave 116 continues to spin with slippage until the cow moves on to free the stop gate.

When a newly arriving stall gate 34 swings downward to form a stall on the plateform conveyor, the stall gate actuates an adjacent switch 124 (FIG. 8) to energize the motor 122 for lifting the stop gate 40. After the cow passes beyond the stop gate 40, the cow brushes against a suitable switch 125 (FIGS. 6 and 7) to energize the motor 122 in a reverse direction for closing the stop gate to hold back the next cow.

*The cow conveyor and stall gates*

The platform conveyor 30 for the cows is of the same general construction as the conveyor described in my prior Patent No. 2,092,440, granted September 7, 1937, which disclosure is incorporated in the present disclosure by reference. The traveling platform itself consists of a continuous chain of interconnected transverse slats which pass around a pair of opposite end sprockets 126, one of which is power-driven. The upper run of the moving platform passes between side rails 128 (FIG. 8) supported by posts 130, the conveyor riding on inwardly extending flanges 132 of the side rails. The lower run of the moving platform may be supported by spaced rollers 134 mounted on the posts 130.

Each of the stall gates that divide the area of the moving platform into stalls is shaped in profile as shown in FIGS. 6 and 14. These gates are moved by upper level chains 135 arranged at opposite sides of the conveyor path and passing at opposite ends around sprockets 136 and 137 respectively. These sprockets 136 and 137 are carried by shafts 138 and 139 respectively journalled in an upper supporting structure 140, which structure also serves to support upper and lower tracks 141 and 142 for the chains 135. The upper tracks 141 are in the form of angle irons which are open from above to permit the stall gates 34 to be readily removed when desired. The lower tracks 142 are channel members. The two chains 135 are driven in any suitable manner in synchronism with the platform conveyor 30 to cause the stall gates 34 to travel at the same rate as the moving platform.

The supporting structure associated with the shaft 138 includes a plate 145 carrying a flange 146 formed as a section of a cylinder with diverging ends, as shown in FIGS. 11 and 12. The sprocket 136 is formed with a laterally extending cylindrical flange 147 which cooperates with the flange 146 to form, in effect, a continuation of the upper track 141.

Each of the stall gates 34 on each of its sides carries three rollers, namely: a pivot roller 150 for pivotal support of the end of the stall gate; a control roller 151; and a stabilizing roller 152. The control rollers 151 of each stall gate enter the pathways formed by the corresponding flanges 146 and 147 as the stall gate reaches the end of the upper run of its path with the consequence that the stall gate is swung upward from its horizontal position with the control rollers pressing against the flange 146. As the stall gate swings past a vertical position towards the dotted position shown in FIG. 11 it shifts slightly by gravity to cause the control rollers 151 to press against the inner cylindrical flanges 147.

An important feature of the arrangement is that after the rollers 131 pass the lower extremities of the flanges 146 they are free to move radially outward from the sprockets 136. Thus the stall gate tends to follow a normal path with the control rollers 151 pressing against the circular flanges 147 of the sprocket wheels 136. But the stall gate is free to swing upward from that normal path in the event that a cow gets in the way under the downwardly swinging end of the gate. If a cow does get in the way to interrupt the downward movement of the stall gate along its normal path, the stall gate assumes an abnormal position such as indicated by the dotted line in FIG. 12. When the stall gate is tilted to such an abnormal position the end of the stall gate presses against the operating arm 154 of a safety switch 155 to stop the conveyor chains 135 as well as the platform conveyor 30. Thus the arrangement keeps a stall gate 34 from injuring a cow. One the other hand with the control roller 151 pressing against the circular flange 147, the stall gate will not yield to the forward pressure of an aggressive cow.

As the downwardly swinging stall gate 34 continues along its normal path, the stabilizing rollers 152 come into engagement with the corresponding curved guide flanges 156 which take commond of the gate and cause the lower ends of the swinging gate to swing forward in a positive manner. By the time that the stabilizing rollers 152 reach the curved guide flanges 156 any cow that is under the advancing gate is far enough forward to be out of danger from injury by the gate. If the cow is laggard, however, the positive forward swinging of the gate will boost the cow forward to its proper position in the newly formed stall.

As a stall gate moves forward on the lower runs of the chains 135 it is essential that the stabilizing rollers 152 as well as the pivot rollers 150 enter the lower track 142 to maintain the stall gate in rigid upright position as the stall gate traverses the milking zone. It is essential, therefore, that the control rollers 151 be guided to positions above the lower track 142 as the gate swings downward to its upright position.

The means for insuring that the control rollers 151 move to their desired upper level paths comprises a small lever 160 and an associated short guide flange 162 adjacent each side of the moving stall gate. As the control rollers 151 reach the lower arms of the small levers 160, the levers block further movement of the control rollers along the path of the conveyor chains 135 and divert the control rollers upward to ride over the short guide flanges 162. As each control roller approaches the corresponding short guide flange 162 it deflects the upper arm of the small lever 160 and thus swings the small lever from the position shown in FIG. 11 to the position shown in FIG. 12, thereby lifting the lower arm of the lever to permit the corresponding pivot roller 150 of the gate to follow the chain conveyor 135 into the lower track 142.

At the exit end of the platform conveyor 30, the successive stall gates 34 are controlled by the structure shown in FIGS. 14 and 15. Spaced plates 164 on opposite sides of the conveyor, corresponding to the previously mentioned spaced plates 145, support the shaft 139 which carries the sprockets 137. The lower runs of the two chains 135 together with the pivot rollers 150 pass from the lower tracks 142 into contact with the peripheries of the sprockets 137 with the control rollers 151 free from restraint. The lower flanges of the tracks 142 extend beyond the tracks to connect with channel-shaped guides 166 and the stabilizing rollers 152 follow this path to the guide. The guide 166 has an upper arcuate flange 168 and has a lower flange 170 which is widened to form an abrupt shoulder 172.

As a cow reaches the exit end of the platform conveyor the cow may be overanxious to return to the home corral and may press forward against the stall gate. It is desirable to make adequate provision to resist such pressure but it is also desirable that the initial upswing of the gate be somewhat abrupt to prepare the cow for leaving the moving platform.

The provision for resisting any forward pressure against the stall gate by an overanxious cow consists of a roller 174 on each side of the gate for cooperation with a fixed inclined flange 175 of the frame structure of the conveyor. At the critical time when a cow may push against the stall gate, the two rollers 174 reach the lower ends of the inclined flanges 175. If the cow does not press against the stall gate the rollers 174 are drawn across the flanges 175 in a normal manner. If a cow does press against the stall gate at such time, however, the inclined flanges 175 cam the stall gate longitudinally upward to jam the pivot rollers 150 against the sprockets 137, the jamming action preventing the gate from swinging forward from its normal path.

The provision for swinging the stall gate abruptly upward after it passes beyond the inclined flanges 175 is the abrupt shoulders 172 of the two guides 166. The stabilizing rollers 152 ride up the shoulders 172 to cause abrupt upward swinging movement of the stall gate and then continue along the flanges 170 for more gradual continued upward swinging movement of the gate. As the stabilizing rollers 152 leave the exit ends of the guides 166 the control rollers 151 encounter upper arcuate guide flanges 176 and ride against the underside of the guide flanges to cooperate with the pivot rollers 150 to cause the stall gate to swing to a horizontal position. The guide flanges 176 continue forward to overhang the upper angle iron track 141 for approximately a distance of four feet. This arrangement causes the two rollers 174 on opposite sides of the swinging end of the stall gate to be guided onto the upper angle iron tracks 141 so that during the return movements of the horizontal stall gates along the upper runs of the two chains 135 the forward ends of the stall gates are supported by the pivot rollers 150 riding on the tracks 141 and the trailing ends are supported by the rollers 174 also riding on the tracks 141.

Since there is always a possibility that the forward side of a stall gate 34 will be contaminated by a cow, it is desirable to wash the forward sides of the stall gates before they return to the entrance end of the platform conveyor. The previously mentioned sprayer 62 serves this purpose.

The sprayer 62 is controlled by a switch 178 having a spring-loaded operating cam 180. As one of the stabilizing rollers 152 moves upward it wipes against the cam 180 to displace the cam for the desired spray period. As shown diagrammatically in FIG. 14a the sprayer 62 is so positioned that as the stall gate swings upward to approach a horizontal position the sprayer delivers a curtain 182 of water in advance of the stall gate to discourage an overanxious cow from emerging prematurely from the platform conveyor 30.

It is contemplated that each of the cows will wear a distinctive tag to indicate which of four quantities of feed is to be supplied to the cow for the period of the milking operation. The tags may be of four different colors and four push buttons of corresponding colors may be provided at the control panel 46. It is important to note that the leading approach lane 36 makes a slight change in direction, as may be seen at 184 in FIG. 1, to place each successive cow at a slight angle to make the tag on the cow visible to an operator at the control panel. The four push buttons are provided for selective control of the four motors 44 shown in FIG. 1.

As indicated in FIG. 8 each of the motors 44 is operative to rotate a corresponding measuring receptacle 185 through a complete revolution about its longitudinal axis. Each of the measuring receptacles 185 is of cylindrical configuration with a longitudinal opening that normally faces upward to receive feed from the interior of the hopper 42. When a measuring receptacle 185 is rotated, it first serves as a gate to hold back feed in the hopper and then empties its content for discharge through a spout 186 at the lower end of the hopper. The measuring receptacles 185 are of different lengths to deliver different quantities. The quantity of feed discharged by one of the measuring receptacles 185 enters the previously mentioned feed bucket 45.

The feed bucket 45 is rigidly attached to a normally upright arm 188 that is mounted on a pivot 190. The movement of the bucket about the axis of the pivot 190 is controlled by a link 192 and a crank 194 that is driven by a motor 195. When the motor is energized for a complete revolution, it swings the feed bucket 45 to the position shown in dotted lines in FIG. 8 to dump the contents into a feed trough 48 on a stall gate 34. The feed troughs 48 are pivotally mounted on the stall gates with their pivot axes above their centers of gravity so that they remain upright throughout all changes in positions of the still gates. The motor 195 is controlled by a normally open switch 196 against which each stall gate 34 brushes as it swings down behind a cow on the platform conveyor.

Automatic means keeps the feed hopper 42 supplied with feed at all times. As indicated in FIG. 1, feed is stored in a large bin 198 and is delivered by conveyor means 200 to the top of the hopper 42 as required. As indicated in FIGS. 8 and 8a feed entering the hopper 42 from above and forming a pile therein first depresses a lower spring-loaded paddle 202 and subsequently depresses an upper spring-loaded paddle 204. As feed is discharged from the hopper 42 first the upper paddle 204 is relieved to return to its upper position and then the lower paddle 202 is relieved to return to its upper position. A suitable electrical control circuit is provided which initiates operation of the conveyor means 200 whenever both of the two paddles 202 and 204 are in their upper positions and which terminates the operation of the conveyor means when both of the paddles are in their lower positions. By virtue of this arrangement the hopper 42 is kept supplied without requiring attention.

*The milking units and their conveyor*

As best shown in FIG. 16, each of the milking units 58 is mounted on a carriage 210 that is supported by rollers 212 on a continuous overhead track 214 of the overhead conveyor 56. Each milking unit 58 includes a glass vacuum tank 215 that serves as a traveling milk receptacle, a vacuum pump 216 driven by an individual motor 218, a hose 220 from the vacuum pump to the glass vacuum tank 215, a hose 222 from the glass vacuum tank to a cluster of teat cups 224, a switch 225 to control the motor 218, and a hook-shaped lever 226 biased by a compression spring 228 to operate the switch 225. The hook-shaped lever 226 de-energizes the motor 218 when the cluster of tea cups 224 is hung on the hook.

The glass vacuum tank 215 has a downwardly directed discharge spout 230 that is normally closed by a valve member in the form of a rubber ball 232. As indicated in FIG. 22, the rubber ball 232 is urged to its normal closed position by a coil spring 234 inside the discharge spout 230 and, of course, when a vacuum exists in the glass vacuum tank, the inward pressure of atmospheric air also urges the rubber ball against the mouth of the discharge spout with sealing pressure.

As shown in FIG. 1, the overhead conveyor track 56 has an operating run 235 paralleling the platform conveyor 30, a return run 236 to return the milking units 58 to the beginning of the milking zone, a curved end portion 238 interconnecting the two runs at the end of the milking zone, and a curved end portion 240 connecting the two runs at the beginning of the milking zone. As indicated in FIG. 17 the overhead track 214 of the overhead conveyor 56 comprises a pair of spaced parallel angle irons 242 having lower inwardly directed flanges 244 on which the rollers 212 of the carriages 210 ride to support the individual milking units.

The milking units 58 are driven along the operating run 235 of the overhead track 56 by means of a first conveyor chain 245 which has upper and lower runs parallelling the overhead track. A second similar conveyor chain 246 of the same character parallels the return run 236 of the overhead track 56, and a radial arm 248 is operated periodically to swing the successive milking units around the curved end portion 240 of the overhead track.

As indicated in FIGS. 16 and 17 each of the two conveyor chains 245 and 246 is supported over its lower run by a pair of channel irons 250 with the lower side of the chain exposed between the angle irons and the upper run of the chain is supported in like manner by an upper pair of angle irons 252. As indicated in FIG. 5, each of the two conveyor chains 245 and 246 is supported by pairs of rollers 254 which, for example, may be spaced four feet apart along the chain.

Provision for electrically energizing the motors 218 of the milking units includes a pair of buss bars 255 which, as shown in FIG. 17, are positioned above the two angle irons 242 by short vertical supports 256. A portion of each of the milking unit carriages 210 extends upward between the two angle irons 244 of the overhead track to support a pair of brushes or wipers 258 at positions to slide along the two buss bars 255 respectively. Each of the brushes 258 is mounted on a transverse rod 260 that is biased by a corresponding coil spring 262 to urge the brush towards the corresponding buss bar. These bus bars 255 extend only along the first conveyor chain 245 so that the milking units are electrically energized only when they are on the operating run 235 of the overhead track 56. When a milking unit is on any other part of the overhead track 56, the motors 218 are de-energized even when the clusters of teat cups are not on the hook-shaped lever 226. This arrangement makes it a simple matter to clean the milking units while they are away from the operating run 235 without any possibility of electrical shock.

Each of the milk unit carriages 210 is provided with suitable means for releasable engagement with the two conveyor chains 245 and 246. The releasable engagement means may, for example, be of the construction shown in FIGS. 18 and 19.

In the construction shown, the engagement means includes an upwardly inclined ratchet pawl 264 mounted by a pivot 265 on a bracket 266 on the carriage. The lower arm of the ratchet pawl is connected by a pivot 268 to a tubular arm 270. One end of a control rod 272 slidingly telescopes into the tubular arm 270, the other end of the control rod forming a handle 274. A suitable coil spring 275 surrounds the control rod 272 in compression between a washer 276 at then end of the tubular arm 270 and a second washer 278 that is fixedly mounted on the control rod. The control rod 272 is provided with a radial pin 280 near the handle 274 which normally abuts a slotted bracket 282 on the carriage. The radial pin 280 may be disengaged from slotted bracket 282 either by lifting the handle 274 or by rotating the handle to align the pin with the slot in the bracket.

In the normal position of the ratchet mechanism shown in FIG. 18 with the radial pin 280 backed against the slotted bracket 282, the ratchet pawl 264 extends upward at an angle for engagement with the conveyor chains 245 and 246. The spring 275 yieldingly carries the normal force by resistance of the carriage to movement along the overhead track 56.

An important advantage of this arrangement is that in the event that a milking unit encounters an obstacle, the increased resistance to movement of the unit simply causes the ratchet pawl 264 to rotate counter clockwise against the spring 275 out of positive engagement with the conveyor chain. Another feature is that shifting the control rod 272 to place a fixed washer 284 thereon in abutment with the slotted bracket 282 permits the ratchet pawl 264 to be rotated past center to the inoperative position shown in dotted lines in FIG. 18 to give the milking unit complete freedom to be moved manually around the overhead track 56 without interference by the two conveyor chains 245 and 246.

As the successive milking units 58 approach the end of the first conveyor chain 245, they trip a switch 285 and coast to a stop at the position shown in full lines in FIG. 10. At this position each of the milking units automatically discharges its quantity of milk into the milk receiver tank 60.

The construction of the milk receiver tank 60 is shown in FIGS. 20-22. The top of the tank is normally covered by a lid 286 which swings about a hinge pin 288 between the open position shown in full lines in FIG. 22 and the closed position shown in dotted lines, the lid being gravitationally biased towards its closed position. As may be seen in FIG. 21 the lid 286 and an adjacent arcuate flange 290 at the top of the tank, form a channel 292 into which the discharge spout 230 of a milking unit enters. The hinged lid 286 is formed with a cam edge 294 so that the lid is cammed to open position by the arrival of the discharge nozzle. Inside the milk receiver tank 60 is a fixed cam rod 295 which is of angular configuration to cam the rubber ball 232 to open position as shown in FIG. 22. It is apparent that as a milking unit coasts to a stop over the opening to the milk receiver tank it is frictionally decelerated by contact with the lid 286 and by contact of the rubber ball with the cam rod 295. As may be seen in FIG. 22, when the lid 286 is in open position its lower edge is close to the side wall of the tank to serve as anti-splash means.

The milk receiver tank 60 discharges at its bottom into a pipe 296 for conveyance away from the milking zone. The pipe 296 is surrounded by a jacket 298 through which refrigerated water is circulated in the direction opposite from the direction of the flow of the milk. FIG. 20 shows a return pipe 300 for the refrigerated water.

The milk receiver tank 60 is provided with an interior sensing electrode 302 that extends into a relatively low level and a second sensing electrode 304 that extends to a higher level. A control arrangement similar to the previously described control arrangement for the feed hopper 42 employs these two electrodes to keep the tank 60 from being completely drained thereby to keep the discharge pipe 296 from being exposed to contaminating the atmospheric air. Thus when the milk level rises to the higher electrode 304 a remote pump (not shown) is energized to draw off milk to the pipe 296 and when the milk level drops below the lower electrode 302, the pump is promptly stopped.

The second chain conveyor 246 which extends along the return run 236 of the overhead conveyor 56 is mounted and driven in the same manner as the first conveyor chain 245 but at a much faster rate, preferably 10 times as fast. The previously mentioned radial arm 248 for transferring a milking unit 58 from the discharge station at the milk receiver tank 60 to the return conveyor chain 246 is driven by a motor 306. Each milk unit carriage 210 is provided with an upstanding pin 308 (FIGS. 10 and 17) for engagement by the radial arm. After a milking unit 58 at the receiver tank 60 is completely emptied the next succeeding milking unit trips the switch 285 to energize the motor 251 for causing the arm 248 to make a complete revolution from its normal idle position indicated in dotted lines at 310 in FIG. 10. At this idle position a brush (not shown) carried by the arm 248 is at a gap in a circular conductor 312. The brush, circular conductor, and the switch 285 are in the circuit of the motor 306.

Each of the milking units 58 that is propelled by the radial arm 248 moves under the end of the second conveyor chain 246 into engagement with the chain. Preferably, as indicated in FIG. 19a, this end of the chain is offset downward by a gravity-biased roller 314 that swings about a pivot 315. The roller 314 forms a downwardly inclined offset 316 in the chain for engagement by the ratchet pawl 264 of each successive milking unit.

There is always a possibility that through inadvertence a milking unit 58 will not be disconnected from a cow before the cow reaches the end of the platform conveyor 30. To take care of this possibility, a safety switch 322 is provided as indicated in FIGS. 6 and 9 for operation by a downwardly extending freely swingable rod 324. When a traveling hose 222 that connects a traveling cow with a milking unit 58 moves against the rod 324, the safety switch 322 is opened to stop both the platform conveyor 30 and the stall gate conveyor 32.

*Wiring diagram*

The parts of the control circuit that may require description are shown in FIG. 23. The circuit of the motor 102 that controls the movement of the barrier assemblies 90 includes a normally clossed stop switch 325 which is on the previously mentioned control panel 46 at the beginning of the milking zone. In series with the switch 325 are a previously mentioned limit switch 326 and four switches 328, which four switches are operated respectively by the four yielding control members 106 on the four individual barriers 92 of a barrier assembly 90. The limit switch 326 which closes when the barrier assembly reaches the end of its forward run is shunted by a normally open switch 330 which is located in the region of the approach lanes and which must be closed manually for continued movement of the barrier assemblies after which one of the barrier assemblies reaches the end of its forward run.

The motor 122 for operating the stop gate 40 is controlled by a reversing switch 332 and a pair of self-locking relays 334 and 335. When a stall gate 34 momentarily closes the previously mentioned switch 124 the relay 334 is locked and at the same time the reversing switch 332 is reversed and the motor lifts the gate until the gate reaches a limit switch 336 to unlock the relay. In like manner when a cow momentarily closes the switch 125 the reversing switch 322 is reversed and at the same time the relay 335 is locked to cause the motor 122 to lower the gate. When the gate reaches its lowermost position it operates a limit switch 338 to unlock the relay 335.

The main motor 340 that operates the platform conveyor 30 and the stall gate conveyor 32 as well as the first conveyor chain 245 of the overhead conveyor 56 is controlled by three switches in series. One switch is the normally closed switch 155 that opens when a cow inadvertently gets under and obstructs one of the stall gates 34 at the entrance to the platform conveyor 30. A second switch is the safety switch 322 that is tripped by the hose of a milking unit if the milking unit is not disconnected from a cow before the cow reaches the end of the platform conveyor. The third switch 342 is a control switch located on the previously mentioned control panel 46.

The four motors 44 associated with the elevated feed hopper 42 are controlled respectively by normally open push button switches 344 and corresponding limit switches 345 which open when the corresponding measuring receptacle 185 makes a complete revolution. Obviously the limit switches 345 may be in the locking circuits of a self-locking relay if desired.

The motor 195 that controls the operation of the feed bucket 45 is controlled by the previously mentioned normally open switch 196 that is operated by each successive stall gate 34. The motor 195 is de-energized by a limit switch 346 and here again the limit switch may be in the locking circuit of a self-locking relay. The motor 306 that controls the radial arm 248 is in series with the previously mentioned circular conductor 312 and the cooperative brush 346 that is carried by the radial arm. When the previously mentioned switch 285 is closed by the arrival of a milking unit 58 at the end of the first conveyor chain 245 the motor is energized and remains energized until the radial arm 248 returns to its normal position at the gap between the ends of the circular conductor 312.

*Operation*

The manner in which the described milking system operates for its purpose may be readily understood from the foregoing description. A herd of cows, anxious to be milked and fed, readily crowds into the parallel approach lanes 35 where a barrier assembly 90 drops behind the cows and automatically moves forward until one of the yielding control members 106 on one of the individual barriers 92 makes contact with a cow. When all of the herd has passed on, the barrier assembly reaches the end of the set of parallel approach lanes 35 and is stopped by the limit switch 326 shown in FIG. 23.

When a new herd enters the set of approach lanes 35 the second barrier assembly 90 is lying flat on the upper run 98 of the conveyor chain 95. When the approach lanes are filled with the new herd the control switch 330 is closed to cause the forward barrier assembly to swing up out of the way and to cause the rearward barrier assembly to swing down in effective position behind the new herd. In the event that a cow inadvertently gets under the downwardly swinging barrier assembly, one of the yieldingly control members 106 will be depressed by contact with the cow to stop the barrier assembly automatically. The cows find their way in their own sequence into the leading lane 36.

As each cow reaches the end portion 184 of the leading lane 36, the cow turns slightly sidewise to permit an operator at the control panel 46 to observe the cows' tags. In accord with the color of the tag, the operator closes one of the four push button switches 344 on the control panel to cause one of the measuring receptacles 180 to discharge the selected quantity of feed through the spout 186 into the feed bucket 45. When a stall gate 34 swings downward behind a newly entered cow on the platform conveyor 30, the stall gate brushes the switch 196 to energize the motor 195 for dumping the feed bucket 45 into the feed trough 48 on the downwardly moving stall gate.

As heretofore described, a downwardly swinging stall gate 34 brushes against a switch 124 to energize the motor 122 for raising the stop gate 40. A cow anxious to be milked and fed moves through the stop gate and brushes against the switch 125 to cause the stop gate to drop and cut off the next succeeding cow.

As a cow steps onto the platform conveyor 30 it passes between the two rotary brushes 54 to spread the brushes apart and cause energization of the brushes. The cow then passes through the warm water sprays 55. On leaving the warm water sprays 55 the cow enters the milking zone proper where the operator at the control panel 46 attaches a milking unit 58 to the cow. There is always at least one milking unit on the curved end portion 240 of the overhead conveyor 56.

The operator moves the milking unit manually onto the operating run 235 of the overhead conveyor 56 whereupon the ratchet pawl 264 on the milking unit automatically engages the lower run of the first conveyor chain 245. After the operator attaches the teat cups 224 to the cow the operator pushes the milking unit 58 ahead along the chain 245 to straighten out the hose 222 of the milking unit. The ratchet pawl 264 simply clicks along the chain 245 to whatever position of adjustment of the milking unit that the operator desires.

The cow continues to feed and the milking unit continues to operate to milk the cow while the cow and the milking unit move synchronously through the milking zone. At the end of the milking zone a second operator disconnects the milking unit from the cow.

At the end of the platform conveyor 30 each stall gate 34 swings upward to release a cow. If an overanxious cow presses against the stall gate in an attempt to lift the stall gate prematurely the rollers 174 on the stall gate cooperating with the inclined flanges 175 cause the stall gate to resist the pressure from the cow in a positive manner.

As a stall gate swings upward to release a cow it momentarily brushes against the cam 180 to close the switch 128 to cause operation of the spray 182. The spray 182 washes down the back of the rising stall gate and at the same time places a curtain of water in front of the cow to momentarily hold back the cow. As the cow leaves the platform conveyor the second operator at the end of the milking zone decides whether or not to operate the diverting gate 68 to divert the cow from the normal return lane 64 into the hospital lane 65.

If by any chance a cow on entering onto the platform conveyor 30 should get in the way of a downwardly swinging stall gate 34, the safety switch 155 will be opened to stop both the platform conveyor and the stall gate conveyor. In like manner if the second operator at the end of the milking zone fails to disconnect the milking unit from a cow the hose 222 of the milking unit swings against the pivoted rod 324 to operate the safety switch 322 to stop the platform conveyor.

When a milking unit is shifted onto the operating run 235 of the overhead conveyor 56 at the beginning of the milking zone, the motor 218 of the unit is not energized until the cluster of teat cups is removed from the hook 226. When the teat cups are returned to the hook 226 at the end of the milking operation the milking unit is automatically de-energized. After a milking operation the milking unit reaches the end of the first conveyor chain 245, tripping the switch 285 and coasting to a position of rest over the milk receiver tank 60. The downwardly extending discharge nozzle 230 of the milking unit automatically opens the lid 286 of the milk receiver and the cam rod 295 inside the milk receiver displaces the rubber ball 232 of the milking unit to cause the milk to be discharged into the receiver.

After a milking unit is emptied the motor 306 is energized automatically as the next succeeding milking unit reaches the switch 285. The radial arm 248 engaging the pin 308 on the empty milk unit swings the milking unit around the curved end portion 238 of the overhead conveyor 56 and the second conveyor chain 246 then automatically picks up the empty milking unit and transports it rapidly to a waiting position on the second curved end portion 240 of the overhead conveyor.

It is apparent that two men, one at the beginning of the milking zone and one at the end of the milking zone may not only take care of the whole milking operation but may also keep the approach lanes under observation. A third man at the approach lanes is desirable, however. In some practices of the invention the yielding control members 106 on the individual barriers 92 may operate buzzers or other signal devices instead of operating switches. With the barriers equipped with buzzers the operator at the beginning of the milking zone may operate a remote control switch to advance the operating barrier assembly 90 periodically until a signal indicates that the barrier assembly has touched a cow of the herd.

The invention reduces the cost of milking cows by a substantial amount since two men can milk 100 cows per hour. The invention makes it possible to economize on feed since the cows are fed only appropriate quantities of feed. The operator at the end of the milking zone may make notes about changing the tags of the cows or periodically the herd may be reviewed at the end of the milking zone to decide on what tags are appropriate.

The apparatus increases the productivity of a herd by a substantial amount because it provides a fixed and unvarying milking routine. It has been found that if a herd of cows has been milked in a conventional manner with variation in the routine each day, the milk production rises substantially if the routine is changed to a fixed unvarying routine. Since the described milking system is nearly 100% mechanical it does provide an unvarying milking routine.

It has been found that if the udder of a cow is treated with warm water, the milk hormones are stimulated. The stimulation requires about one minute and initiates a period of activation of the hormones which lasts for another seven minutes. For maximum production it is essential, therefore, that the milking operation to be started promptly and be completed within the eight minute cycle. The warm water sprays 55 provided the desired stimulation and the described apparatus insures that the cow will reach the first operator and be connected to a milking unit within the first minute of the cycle and the apparatus further insures that the milking operation will be completed well within the remaining seven minutes of the cycle.

My description in specific detail of the selected embodiments of the invention will suggest various changes, substitutions and other departures from my invention within the spirit and scope of the appended claims.

I claim:

1. In a system of the character described for milking cows, the combination of: a platform conveyor to convey the cows in sequence through a zone for milking operation; a plurality of gates to divide the area of the platform conveyor into stalls for the individual cows; means to move said stall gates on a continuous path with the stall gates moving synchronously with the platform conveyor along one run of the path and returning along a second run of the path with the returning gates swinging successively from retracted positions to effective positions to form the successive stalls; and means operatively associated with the platform conveyor and the stall gate moving means and automatically operative to stop the movement of the platform conveyor and the movement of the stall gates in response to a cow obstructing the movement of a stall gate from its ineffective position to its effective position.

2. In a system of the character described for milking cows, the combination of: a platform conveyor for carrying cows in succession from a starting point through a zone for a milking operation; a plurality of spaced stall-forming gates; continuous conveyor means to move said plurality of stall gates in a forward direction in synchronism with the platform conveyor with the gates in effective positions, to return the gates to said starting point along an elevated path and to swing the successive gates downward to return the gates to their effective positions in the region of said starting point, said gates being pivotally connected to said continuous conveyor means; means to restrain gravitational swinging movement of the gates as the gates return from their ineffective positions to their effecive positions with freedom for the gates to be lifted relative to the restraining means, whereby the gates follow a normal return path from their ineffective positions to their effective positions in the absence of obstructions and follow an alternate abnormal path in the evc̱t a cow obstructs the normal path; and means operatively associated with the conveyors and automatically operative to stop said platform conveyor and said continuous conveyor means in response to obstruction of said normal path by a cow, said stopping means including a stop switch responsive to movement of a stall gate along said alternate path.

3. A combination as set forth in claim 2 in which each of the stall gates is free to be elevated relative to the retaining means during a portion of the movement of a stall gate from its ineffective position to its effective position in the region of said starting point and which includes means automatically operative to exert power to continue the movement of the gate forwardly in a positive manner over a later portion of said movement to boost a cow in the direction of movement of the platform conveyor in the event a cow lags when a stall gate swings downward.

4. In a system of the character described for milking cows, the combination of: a platform conveyor for carrying cows in succession from a starting point through a zone for a milking operation; a plurality of spaced stall-forming gates; continuous conveyor means to move said plurality of stall gates in a forward direction in synchronism with the platform conveyor with the gates in effective positions, to swing the gates upward to open said stalls for removal of the cows at the end of said zone, to return the gates to said starting point along an elevated path and to move the successive gates downward to their effective positions in the region of said starting point; and means to wash the leading faces of said gates as they swing upward to open said stalls, said washing means comprising a spray and control means to operate the spray in response to a portion of the upward movement of stall gate.

5. A combination as set forth in claim 4 in which said spray means is positioned to deliver a spray past the swinging edge of an upwardly swinging gate thereby to provide a curtain of water to delay the exit of a cow from a stall until the stall gate is lifted to a position to clear the cow.

6. In a system of the character described for milking cows, the combination of: a lower continuous conveyor forming a forwardly moving platform; an upper continuous conveyor paralleling the lower conveyor, said upper conveyor having a lower forward run and an upper rearward run; a plurality of stall gates on said upper conveyor spaced apart on both said lower run and said upper run; fixed structure adjacent said upper conveyor; cooperating means on said fixed structure and said stall gates and operatively associated therewith to rigidly position the stall gates in downwardly extending position on said lower run and to move the stall gates downward to their vertical positions at the entrance to the platform conveyor, the cooperative means on the fixed structure having a gap to give the successive stall gates freedom to depart upward from their normal paths as they move downward thereby to prevent a stall gate from exerting excessive downward pressure on a cow that obstructs the downward movement of the stall gate; and safety means automatically operative to stop both of said conveyors in response to upward departure of a downwardly moving stall gate from its normal path.

References Cited by the Examiner
UNITED STATES PATENTS

| | | | |
|---|---|---|---|
| 1,834,175 | 12/1931 | Peck | 119—159 |
| 1,863,603 | 6/1932 | Marshall | 119—14.03 X |
| 1,959,716 | 5/1934 | Hapgood | 119—14.04 |
| 1,968,564 | 7/1934 | Luks | 119—14.04 |
| 2,021,591 | 11/1935 | Corderoy | 119—14.03 |
| 2,092,440 | 9/1937 | Cain | 119—14.04 |
| 2,305,259 | 12/1942 | Jeffers | 119—14.04 |
| 2,358,000 | 9/1944 | Cornell | 119—14.04 |
| 2,630,903 | 3/1953 | Currivan | 198—232 |
| 2,671,428 | 3/1954 | Hill | 119—14.03 |
| 2,691,359 | 10/1954 | Anstiss et al. | 119—20 |
| 2,721,538 | 10/1955 | Latham | 119—91 |
| 2,814,271 | 11/1957 | Black | 119—55 |
| 2,879,885 | 3/1959 | Myers | 198—232 |
| 2,932,382 | 4/1960 | James | 198—232 |
| 2,986,268 | 5/1961 | Robson et al. | 198—232 |

OTHER REFERENCES

"The Furrow" (magazine) January 1960, 119—27.

SAMUEL KOREN, *Primary Examiner.*

CARL W. ROBINSON, T. GRAHAM CRAVER, ABRAHAM G. STONE, J. O. BOLT, HUGH R. CHAMBLEE, *Assistant Examiners.*